Patented Mar. 19, 1929.

1,705,953

UNITED STATES PATENT OFFICE.

ALOIS ZINKE, OF GRAZ, AUSTRIA, ASSIGNOR TO FELICE BENSA, OF GENOA, ITALY.

MANUFACTURE OF VAT DYESTUFFS OF THE ISODIBENZANTHRONE SERIES.

No Drawing. Application filed September 30, 1925, Serial No. 59,722, and in Austria November 11, 1924.

My invention relates to the manufacture of vat dye stuffs of the isodibenzanthrone series from diaroyl dihalogen perylenes having two halogen groups in the perylene nucleus and each aroyl group occupying a position peri to one of the halogen groups and having a free ortho position. Such diaroyl dihalogen perylenes may be obtained by condensing suitable starting materials by means of anhydrous aluminium chloride, that is to say, by the known method of Friedel-Crafts.

My invention consists in treating the said diaroyl dihalogen perylenes with alkali metal hydroxides in the presence of organic solvents such as aniline or quinoline.

Example I.

1 part by weight of dibenzoyl dibromo perylene satisfying the above named conditions and prepared as hereinafter described, is heated with 50 parts by weight of aniline and 5 parts by weight of powdered hydroxide of potassium for an hour to slow boiling. The liquid becomes brownish green in color, a violet precipitate being deposited therefrom. After one hour's boiling the precipitate is separated by filtration and washed with alcohol and water, the product then forming a dark powder which when heated with dilute aqueous sodium hydroxide gives a blue vat showing red fluorescence. Cotton on taking up the vat becomes blue and in contact with air it becomes violet. The color is very fast and more particularly fast against the action of chlorine, acids and alkalies, and is also fast as to washing. In concentrated sulphuric acid the dye stuff dissolves with a blue green color and shows red fluorescence. On diluting with water the dye stuff is precipitated in violet flakes. In solvents having a low boiling point such as alcohol, acetone, ether, chloroform, bisulphide of carbon, benzene, etc., the dye stuff is almost insoluble; in boiling nitrobenzene it dissolves slightly more easily with a blue color and red fluorescence. From this solution it is precipitated on cooling in small crystals. A particular purification is superfluous as the product obtained is uncommonly pure. The same dye stuffs are obtained by treating the dibenzoyl dibromo perylene with melting alkalies.

Example II.

3 parts by weight of dibenzoyl dichloroperylene satisfying the above conditions are heated to boiling with 15 parts of powdered caustic alkali and 60 parts by volume of quinoline for 3 to 4 hours. The dye stuff thus formed is filtered off and washed with alcohol and water. The output amounts to 70%. Impurities, if there are any, may be removed by means of glacial acetic acid. The dibenzoyl dibromo or dichloro perylene above referred to may be obtained by condensing 3,9 dibromo or dichloro perylene with benzoyl chloride by means of anhydrous aluminium chloride. The following are the formulæ illustrating the reaction described in Example I. Example 2 is illustrated by similar formulæ in which, however, chlorine atoms instead of bromine atoms occupy the 3,9 position in the perylene nuclei.

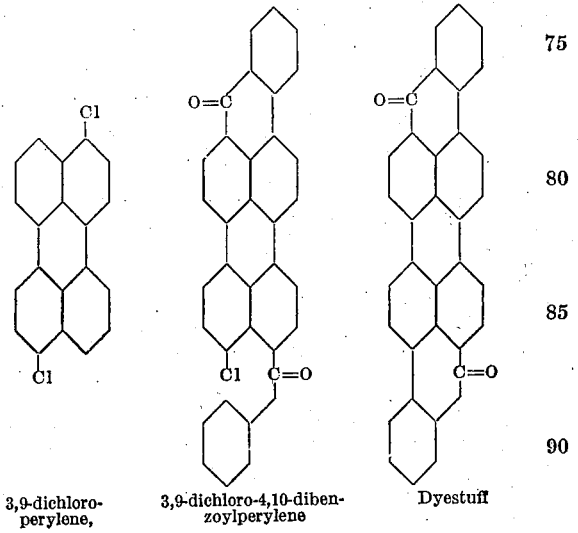

3,9-dichloroperylene,    3,9-dichloro-4,10-dibenzoylperylene    Dyestuff

Example III.

1 part by weight of di-p-chloro benzoyl perylene dichloride satisfying the above conditions is mixed with 6 parts by weight of powdered caustic potash and 20 parts by volume of quinoline and heated to boiling for about 40 minutes. The solution becomes beautifully violet blue. The dye stuff formed is separated after cooling by suction and then washed with alcohol and water. The output amounts to 0.65 parts by weight. The dye stuff is very pure and readily forms a vat of a blue color without any perceptible fluorescence. It dissolves in concentrated sulphuric acid with a blue tinged green color. Cotton is dyed blue with a violet tinge. The di-p-chloro benzoyl perylene dichloride is obtained by condensing 3,9 dichloro perylene with the chloro benzoyl chloride by means of aluminium chloride. The entire process is illustrated by the following formulæ:

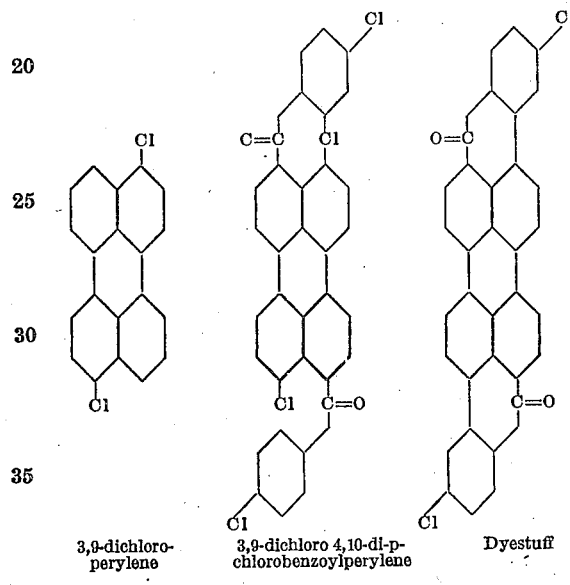

3,9-dichloroperylene    3,9-dichloro 4,10-di-p-chlorobenzoylperylene    Dyestuff

Example IV.

1 part by weight of 3,9 dichloro perylene having a fusing point of 280 to 281° centigrade is mixed with 2½ parts by weight of chloride of p-toluic acid, 3 parts by weight of powdered aluminium chloride and 40 parts by volume of bisulphide of carbon, and the mixture is left to itself for 24 hours, all moisture being excluded. The reaction mass of a deep bluish red color is then boiled for 3 hours, reflux being used whereby the reaction is completed, and further treated in the usual way above referred to. By recrystallizing from nitrobenzene the product is obtained, in the form of orange colored needles melting at 325° centigrade and dissolving in concentrated sulphuric acid with a deep violet tinged red colour.

For converting the di-p-toluyl compound thus obtained, 1 part by weight thereof is boiled with 5 parts of powdered caustic potash in 50 parts quinoline until the color changes. The dye stuff separated by cooling and suction filtering is washed with alcohol and water. The vat is blue with an intense red fluorescence. Cotton is dyed violet.

The following formulæ illustrate the entire process:—

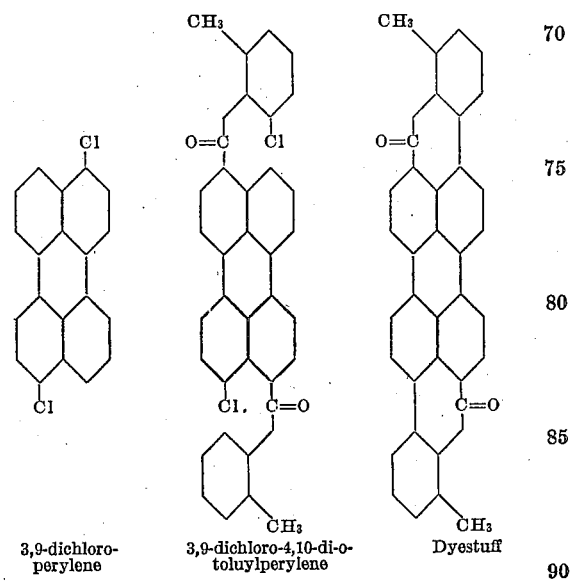

3,9-dichloroperylene    3,9-dichloro-4,10-di-o-toluylperylene    Dyestuff

Example V.

1 part of 3,9 dichloro perylene and 1½ parts of aluminium chloride are intimately mixed and suspended in 11 parts of bisulphide of carbon, and to the suspension 1.1 parts of chloride of m-toluic acid are added, whereupon a violent reaction immediately begins, hydrochloric acid being evolved. The reaction mass becomes deeply blue. After the whole has been left to itself for 12 hours, it is heated in a water bath for 5 hours. After cooling, the double compound of aluminium chloride is first treated with ice and then with dilute hydrochloric acid and finally, after the bisulphide of carbon has been distilled off, it is boiled with dilute hydrochloric acid. The raw product, the output of which is 1½ parts, is dark brown in color, and melts after repeated recrystallization from nitrobenzene at 334° centigrade. The compound is slightly soluble in solvents having a low boiling point. It is readily soluble in aniline and nitrobenzene. In concentrated sulphuric acid it dissolves with a blue color. The di-m-toluyl dichloro perylene thus obtained is the starting material for manufacturing a dye stuff according to my invention.

1 part of the di-m-chloro toluyl dichloro perylene is heated to boiling with 5 parts of caustic potash in 15 parts of quinoline. In a few minutes the color is changed into violet. After the reaction is completed the whole is kept boiling for 20 minutes. After cooling the liquid is drawn off by suction and the residue is washed with alcohol and water. On extracting the product so obtained with hot quinoline the dye stuff crystallizes on cooling from the solution. The compound is soluble in hot nitrobenzene, aniline and quinoline with a deep blue color and in concentrated sulphuric acid it dissolves with a deep green color. Cotton is dyed violet.

The entire process is illustrated by the following formulæ:—

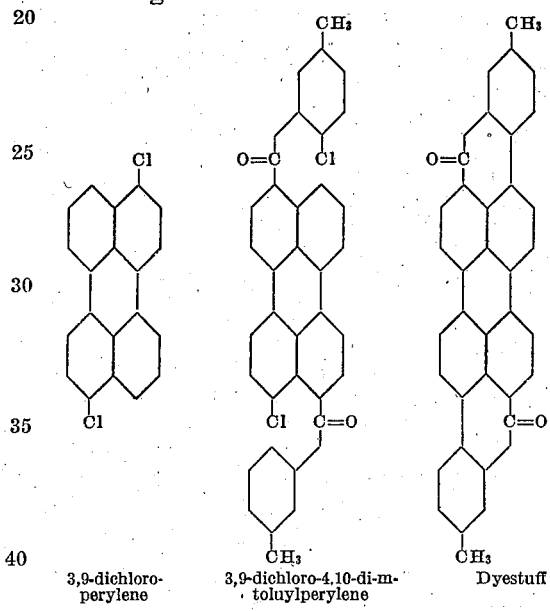

3,9-dichloro-perylene    3,9-dichloro-4,10-di-m-toluylperylene    Dyestuff

Example VI.

The intermediate product is prepared by means of chloride of o-toluic acid as described in the immediately preceding example. The pure substance is obtained from the raw product by recrystallizing from nitrobenzene. It fuses at 351° centigrade and is only slightly soluble in solvents having a low boiling point but is readily soluble in aniline and nitrobenzene. In concentrated sulphuric acid it dissolves with a blue color, the condensation to a dye stuff being the same as described in Example V. The dye stuff dissolves in warm nitrobenzene, aniline, and quinoline with a violet color and cotton is dyed with a considerably more marked blue tinge.

The entire process is represented by the following formulæ:

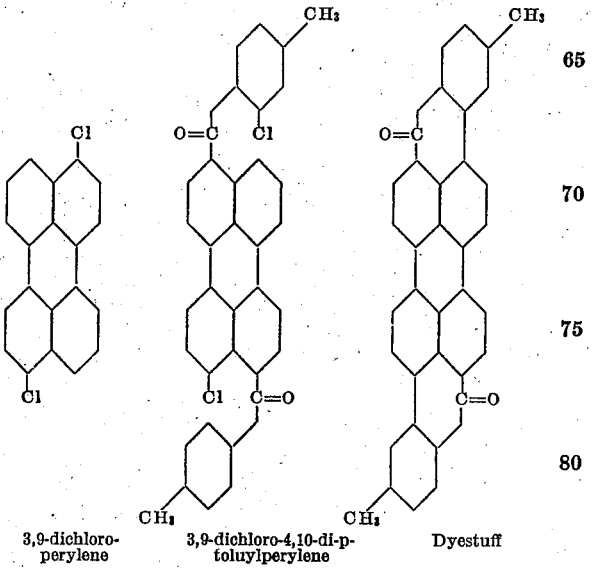

3,9-dichloro-perylene    3,9-dichloro-4,10-di-p-toluylperylene    Dyestuff

Example VII.

1 part of 3,9 dichloro perylene and 1.2 parts of α naphtoylchloride are caused to react in 10 parts of bisulphide of carbon by means of 1 part of aluminium chloride. The mixture is left to itself for 12 hours and then it is heated for 3 hours in a water bath. The resulting mass is treated as described in the preceding examples. The yellow final product has a fusing point of 230° centigrade. For purifying it, it is recrystallized from a mixture of nitrobenzene and glacial acetic acid. The pure di-α naphthoyl dichloro perylene thus obtained melts at 275° centigrade. The compound is insoluble in the solvents having a low boiling point, but it is readily soluble in aniline, nitrobenzene and quinoline, and in sulphuric acid it dissolves with a bluish green color.

The closing of the ring for forming the dye stuff is brought about as follows:—1 part 4-α naphthoyl 3,9 dichloro perylene and 4 parts of caustic potash are heated in quinoline to boiling. After 10 minutes the reaction is completed and after cooling the dye stuff is separated by suction and is then washed with alcohol and water. The crude dye stuff dissolves in sulphuric acid with a greenish blue color and cotton is dyed blue. The entire process is illustrated by the following formulæ:—

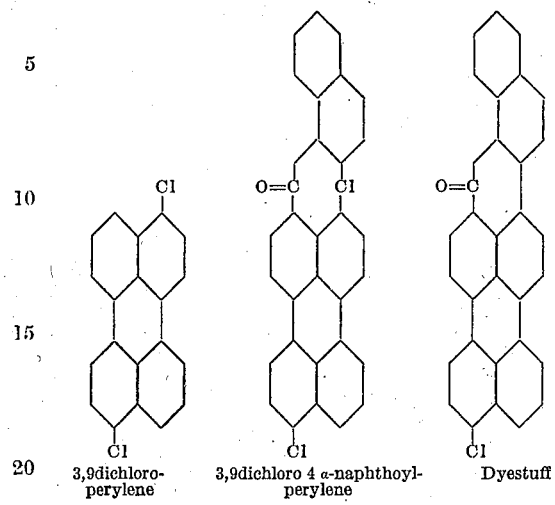

3,9dichloro-perylene    3,9dichloro 4 α-naphthoyl-perylene    Dyestuff

What I claim is:—

1. A process for manufacturing dye stuffs of the isodibenzanthrone series consisting in treating diaroyl dihalogen perylenes having two halogen groups in the perylene nucleus and each aroyl group occupying a position peri to one of the halogen groups and having a free ortho position with alkali metal hydroxides at elevated temperatures in the presence of organic solvents.

2. A process for manufacturing dye stuffs of the isodibenzanthrone series consisting in treating diaroyl dihalogen perylenes having two halogen groups in the perylene nucleus and each aroyl group occupying a position peri to one of the halogen groups and having a free ortho position with alkali metal hydroxides at elevated temperatures in the presence of aniline.

3. A process for manufacturing dye stuffs of the isodibenzanthrone series consisting in treating dibenzoyl dibromo perylene having two bromine atoms in the perylene nucleus and each benzoyl group occupying a position peri to one of the bromine atoms and having a free ortho position with alkali metal hydroxides at elevated temperatures in the presence of organic solvents.

4. A process for manufacturing dye stuffs of the isodibenzanthrone series consisting in treating dibenzoyl dibromo perylene having two bromine atoms in the perylene nucleus and each benzoyl group occupying a position peri to one of the bromine atoms and having a free ortho position with alkali metal hydroxides at elevated temperatures in the presence of aniline.

In testimony whereof I have affixed my signature.

ALOIS ZINKE.